United States Patent Office.

BYRON W. NICHOLS, OF CANTON, OHIO, ASSIGNOR TO HIMSELF, CORNELIUS AULTMAN, GEORGE A. BUCKIUS, PERCY S. SOWERS, AND A. CLARK TONNER, OF SAME PLACE.

Letters Patent No. 92,876, dated July 20, 1869.

IMPROVEMENT IN CONVERTING ARTICLES OF CAST-IRON INTO STEEL.

The Schedule referred to in these Letters Patent and making part of the same.

*To all whom it may concern:*

Be it known that I, BYRON W. NICHOLS, of Canton, in the county of Stark, and State of Ohio, have invented a new and useful Improvement in Converting Cast-Iron Articles into Steel; and I do hereby declare that the following is a full, clear, and exact description thereof.

I take black oxide of manganese, sulphate of iron, common salt, and common resin, or their chemical equivalents, in about the following proportions, viz:

Black oxide of manganese, twenty parts.
Sulphate of iron, ten parts.
Common salt, ten parts.
Common resin, ten parts.

I grind or pulverize the ingredients to a powder, and intimately mix them. I put the whole into a suitable vessel, and apply a gentle heat, sufficient to melt the resin, making a semi-fluid mass of the whole. I then take the articles I wish to convert, and dip them into the melted compound, leaving a coating of the compound adhering to the articles, to the thickness of about one-sixteenth of an inch or more; after which I put the articles thus coated into saggers, or suitable annealing-cases, surrounded with oxide of iron, or scales of iron or steel, or their chemical equivalents.

I then seal the annealing-cases with fire-clay or other suitable material, to exclude the air as perfectly as possible, and submit them to a red heat in an annealing-kiln or oven, for from one to ten hours, more or less, according to the thickness of the articles to be converted.

As it is sometimes necessary that the iron scales, or oxide of iron, should possess the highest possible degree of oxidation, I moisten it, when I deem it best, with a solution of sal-ammonia, or its equivalent, in order to insure perfect oxidation, but do not wish to confine myself strictly to its use, unless the nature of circumstances requires it.

Having thus described the nature and operation of my improvement,

What I claim as my invention is—

1. The use of the ingredients herein named, when compounded and used in the manner and in about the proportions herein described, and for the purpose set forth.

2. The employment of iron oxides, or their chemical equivalents, as a packing in the process of converting into steel, articles of iron which have previously been cast into the desired form for use.

BYRON W. NICHOLS. [L. S.]

Witnesses:
A. J. UNDERHILL,
D. R. HOSTETTER.